United States Patent [19]
Larsen

[11] 3,813,785
[45] June 4, 1974

[54] VERNIER ATTACHMENT

[76] Inventor: Otis M. Larsen, 4036 Reservoir Blvd., Minneapolis, Minn. 55421

[22] Filed: Oct. 12, 1971

[21] Appl. No.: 188,242

[52] U.S. Cl. ............................... 33/169 B, 33/107
[51] Int. Cl. .............................................. G01b 5/18
[58] Field of Search ......... 33/107, 16 TB, 173, 1 D, 33/112, 113, 103

[56] References Cited
UNITED STATES PATENTS

| 442,020 | 12/1890 | Darling | 33/107 R |
|---|---|---|---|
| 2,502,039 | 3/1950 | Floyd | 33/107 R |
| 3,533,165 | 10/1970 | Larsen | 33/95 |

FOREIGN PATENTS OR APPLICATIONS

| 103,555 | 3/1916 | Great Britain | 33/169 B |
| 475,353 | 2/1915 | France | 33/169 B |
| 761,190 | 11/1956 | Great Britain | 33/173 |
| 560,474 | 4/1944 | Great Britain | 33/169 B |

*Primary Examiner*—Samuel B. Rothberg
*Assistant Examiner*—Charles E. Phillips
*Attorney, Agent, or Firm*—Merchant, Gould, Smith & Edell

[57] ABSTRACT

A vernier block, for attachment to a standard measuring blade, in which the block working edge provides the primary measurement between the blade and the working edge, and in which the block is in a gauge block having a scale which, in conjunction with the blade scale, acts as a vernier.

4 Claims, 5 Drawing Figures

PATENTED JUN 4 1974　3,813,785
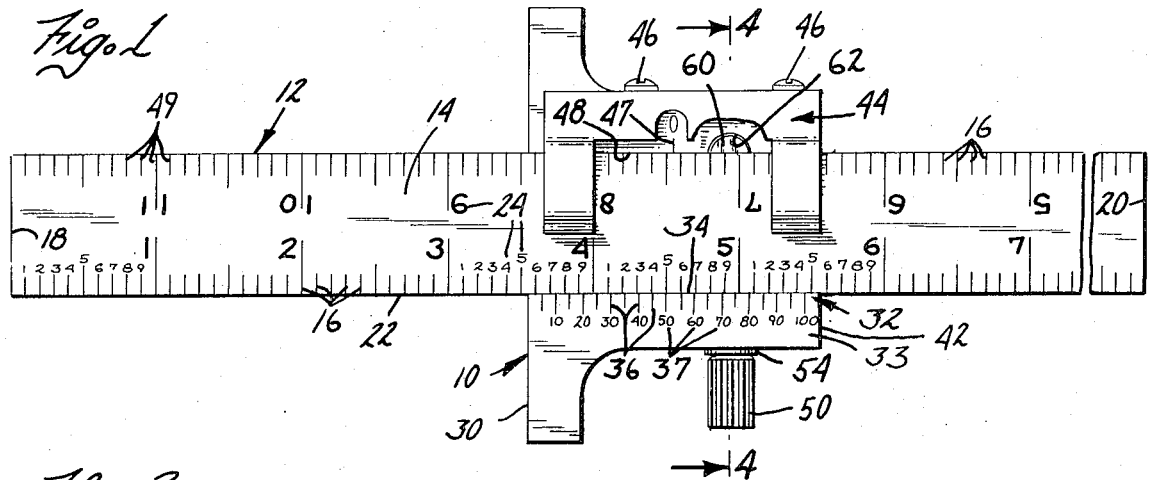
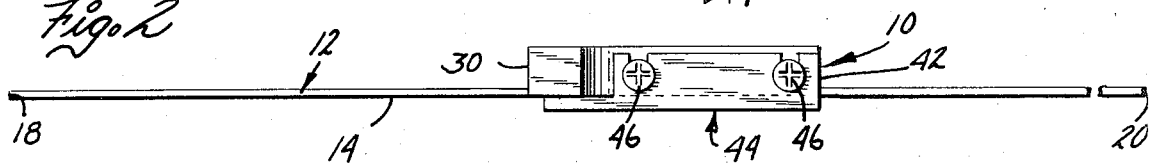
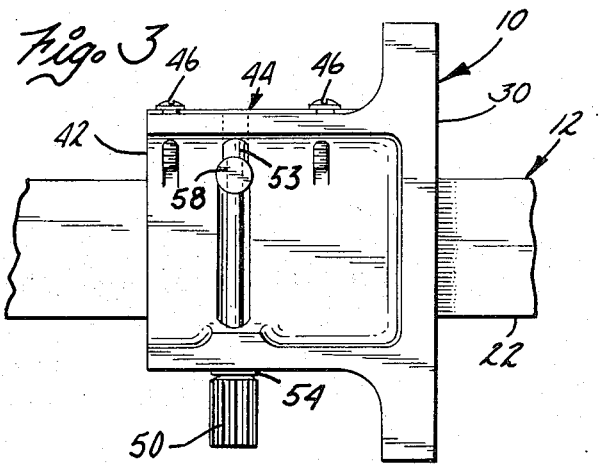
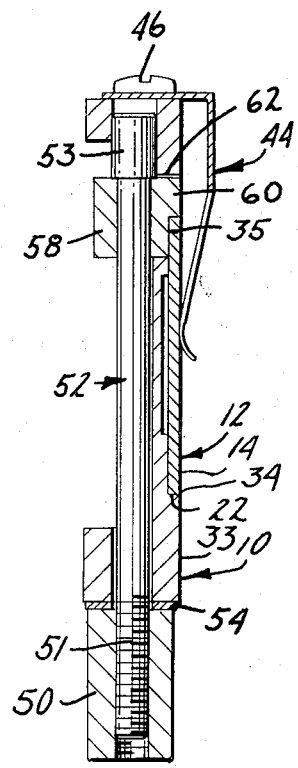
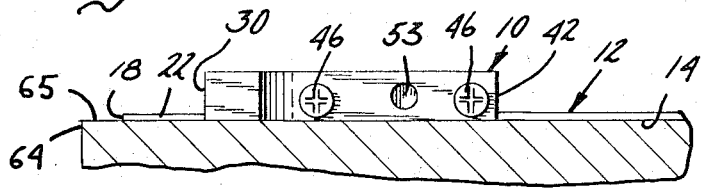
INVENTOR.
*Otis M. Larsen*
BY *Merchant & Gould*
ATTORNEYS

VERNIER ATTACHMENT

BACKGROUND OF THE INVENTION

1. Field of the Invention

This invention relates generally to blade scales and more particularly concerns those having a vernier attachment.

2. Description of the Prior Art

In the construction field, blade scales are widely used. In general, the blade has a plurality of scales thereon with different graduations, such as 1/8 inch, 1/16 inch, 1/32 inch, 1/64 inch, etc. To utilize the blade a head is generally provided on the blade for alignment with the desired graduation on the blade and the measurement between this point and the blade end. However, it is extremely difficult to accurately align the head with a line scribed on the blade, especially if the lines are extremely fine and close together. Thus, a vernier is needed on the head. In the prior art, verniers have been incorporated with caliper-type measuring devices. Examples include U.S. Pat. No. 1,969,624 and U.S. Pat. No. 3,309,775. However, because of the attachment at one end of the blade to form one side of the caliper, these devices cannot be used to measure depth within limited spaces. Additionally, the primary measuring point must be displaced from the second caliper edge in order to measure the distance between the two calipers. The primary measurement is thus placed within the vernier and this displacement makes the device inconvenient and difficult to read.

Accordingly, it is an object of the present invention to provide a vernier attachment for a measuring blade wherein the primary measurement point is at the vernier working edge and the second measurement point is within the vernier.

It is an additional object to provide a vernier attachment whereby the blade face and vernier face are coplanar so as to be able to measure on a flat surface and in order to eliminate parallax in reading the vernier scale.

It is further the object to provide a vernier attachment which is a gauge block thus providing two working edges for use in measurements.

Additionally, it is an object to provide a vernier attachment having an auxiliary vernier mark for more accurate alignment of the vernier working edge.

SUMMARY OF THE INVENTION

In accordance with the invention, a vernier is provided for attachment to a measuring blade. The vernier has a working edge perpendicular to the blade and a graduated edge in parallel juxtaposition with the blade edge and perpendicular to the working edge. A zero graduation coincides with the working edge and the graduation extends to a second working edge parallel to the first working edge a distance which is a multiple of a unit on the measuring blade thus making the vernier a gauge block. The vernier has attached thereto a removable clamp for biasing the measuring blade within a recess in the vernier so that the blade face and the vernier face are coplanar. A second graduated edge is provided with a single graduation for auxiliary alignment of the primary working edge.

BRIEF DESCRIPTION OF THE DRAWINGS

Referring to the drawings, wherein like characters indicate like parts throughout the figures.

FIG. 1 is a view in side elevation of the vernier attachment attached to a measuring blade;

FIG. 2 is a view in bottom elevation of the vernier attachment and measuring blade;

FIG. 3 is a view of the back side of the vernier attachment and blade;

FIG. 4 is a view taken along a line 4—4 of FIG. 1; and

FIG. 5 shows the vernier attachment attached to the measuring blade with the clamp removed and measuring upon a flat surface.

DESCRIPTION OF THE PREFERRED EMBODIMENT

Referring first to FIG. 1, the numeral 10 generally designates a vernier block which is lockable on, and also moveable with respect to, a measuring blade 12. Blade 12 is a standard rectangularly shaped measuring blade and generally has a plurality of scales thereon. As shown, blade 12 has a top surface 14 carrying graduations 16, located at the top and bottom edge of the top surface 14, which extends between end 18 and end 20. As shown, bottom edge 22 is the measuring edge. Numerals 24 are associated with graduations 16 and are provided on the blade 12 for measuring.

Vernier block 10 is shown with a square face working edge 30. In the normal operation of measuring, the working edge 30 is aligned with a preferred graduation 16 on the blade 12. However, as can be seen, it is extremely difficult to align the working edge 30, which is a surface perpendicular to the surface of blade 12, with a graduation on the blade 12, especially if the graduation is extremely small such as 1/50 of an inch.

In order to provide a more precise measurement, a secondary measurement point must be provided in addition to the primary measurement point of working edge 30. Thus, a vernier scale 32 is provided on the top surface 33 of vernier block 10. Scale 32 is associated with an edge 34 perpendicular to working edge 30 and in parallel juxtaposition with blade edge 22. As seen in FIG. 4, blade 12 is disposed within a recess 35 in vernier block 10 so as to make vernier surface 33 coplanar with blade surface 14. This coplanar relationship (shown in FIG. 5) allows for the measurement along flat surfaces by placing the surface 14 and surface 33 against the flat surface to be measured. Also, the coplanar relationship eliminates any parallax in the reading of the vernier. The vernier measurement is provided by the association of graduations 36, having numerals 37, with graduations 16, having numerals 24. Graduations 36 extend between working edge 30 and a second working edge 42. The distance between edges 30 and 42 is a multiple of one unit on blade 12 (in this case 2.000 inches) and thus the vernier block 10 constitutes a gauge block. This allows measurements to be made between both working edges 30 and 42 to either end 18 or 20.

An auxiliary mark 47 is provided along edge 48 of vernier block 10 exactly one inch from both working edges for cooperation with graduations 49 on the top surface of blade 12 to act as a zero reference. An operator, by using the zero reference, can more accurately set the vernier.

Referring additionally to FIGS. 2 and 4, a clamp 44 is shown securely attached by screws 46 to vernier block 10. As seen in FIG. 4, clamp 44 biases blade 12 within recess 35. Clamp 44 is normally attached to vernier block 10 but is removable by loosening screws 46 and sliding the clamp out from under the screws. With clamp 44 removed, the block 30 and blade 12 can be used to measure flat surfaces as earlier described.

Referring now to FIGS. 3 and 4, a lock nut 50 is shown screwed upon a threaded portion 51 of bolt 52. A washer 54 separates the forward end of lock bolt 50 from the vernier block housing 56. Bolt 52 has a boss 53 at the top end thereof and a lock head 58 which is press fitted upon bolt 52 up to boss 53. A portion 60 of boss 53 projects through a hole 62 in vernier block 10 (see also FIG. 1). Thus, the turning of lock nut 50 upon bolt 52 will cause boss portion 60 to pinch blade 12 between vernier edges 48 and 34 restraining the blade 12. The loosening of nut 50 has the effect of moving boss portion 60 upward with hole 62 and allowing vernier block 10 to move longitudinally with respect to blade 12 while clamp 44 biases blade 12 within recess 35. Blade 12 can be tightened within vernier block 10 and clamp 44 removed in order to measure along flat surfaces as shown in FIG. 5.

In operation, the working edge 30 of vernier block 10 constitutes the primary measurement point for distances between working edge 30 and points on blades 12. Generally, the distance to be measured will be the distance from working edge 30 to the end 18 of blade 12. Referring to FIG. 1, the primary reference, working edge 30, shows a reading of 3 5/10 inches. However, it is evident that working edge 30 is located some value between 3 5/10 and 3 6/10. In order to ascertain the increment by which working edge 30 surpasses 3 5/10, reference must be had to a secondary measurement which is provided by the graduations 36 on vernier scale 32 acting in association with graduations 16 on blade 12. Numerals 37 are shown graduated in 1/1,000 of an inch. Thus, in order to determine how many hundredths of an inch edge 30 is located past 3 5/10, the single graduation 16 on blade 12 which aligns with the graduation 36 on vernier scale 32 must be found. In FIG. 1, the 51/1,000 of an inch graduation on scale 32 is aligned with a graduation 16 on blade 12. Thus, working edge 30 is located 3 55/100 of an inch from edge 18.

Referring to FIG. 5, in order to measure the distance inwardly from edge 64 working edge 30 would normally be placed against edge 64 and the blade would be upon surface 65 measuring inwardly to blade end 18. The measurement would then be found as described above.

If a measurement were desired from edge 64 outwardly to a remote point, working edge 42 could be placed against edge 64, with blade end 20 resting upon and supported by surface 65, and the distance from edge 42 to blade end 18 could be used as the measurement. For the setting shown in FIG. 1, the reader would refer first to edge 42 to determine that the measurement is a value between 5 5/10 and 5 6/10. In order to ascertain the increment by which the working edge 42 surpasses 5 5/10, reference would be had to vernier scale 32. Alignment of fifty one-thousandths on scale 32 with any graduation 16 on blade 12 would indicate that edge 42 is located 5 55/100 inches from edge 18. Another advantage in having edge 42 is that with it measurements can be made from end 18 along the entire length of the blade up to end 20.

Auxiliary mark 47 is provided in order to locate working edge 30 along a whole numeral such as 1 inch, 2 inches, etc. That is, when it is desired to locate either working edge 30 or working edge 42 along a whole numeral, the alignment of mark 47 with a whole numeral 24 will provide accuracy of the alignment of the working edge.

What is claimed as new is as follows:

1. A gauge attachment for use with a rectangular-shaped blade having at least one graduated edge with units associated therewith comprising:
    a. a gauge block having a first working edge and a second edge perpendicular to and intersecting said first working edge;
    b. the second edge of said gauge block having graduations thereon positioned with a zero graduation coinciding with said first working edge, said graduations being such as to act as a vernier in conjunction with the graduated edge of said blade;
    c. said gauge block having a unit length that is a multiple of one unit on said blade extending from said first working edge to a second working edge parallel to said first working edge and perpendicular to and intersecting said second edge; and
    d. means affixing said gauge block to said blade for locking said gauge block with respect to said blade and for slidably moving said gauge block with respect to said blade.

2. The apparatus of claim 1 wherein:
    a. said affixing means includes a removable clamp affixable to said gauge block for biasing said blade within a recess of said gauge block; and
    b. said gauge block has a top surface coplanar with a top surface of said blade and said top surface of said blade being coplanar to a top surface of said gauge attachment when said clamp is removed.

3. The gauge block of claim 2 wherein said removable clamp includes a spring clip having means for biasing said blade within said recess and a slotted portion for cooperation with screw means on said gauge block for securement to said gauge block and sliding removal therefrom upon adjustment of said screw.

4. The apparatus of claim 3 wherein said gauge block contains an auxiliary zero mark on a fourth edge, said edge being parallel to said second edge, said mark being such as to act as a zero reference in conjunction with graduations on a second graduated edge of said blade where said second graduated edge has graduations corresponding to said first graduated edge.

* * * * *